United States Patent [19]

Kubota et al.

[11] Patent Number: 5,195,359
[45] Date of Patent: Mar. 23, 1993

[54] APPARATUS FOR DETECTING OPERATING CONDITION OF INTERNAL-COMBUSTION ENGINE

[75] Inventors: Shunsuke Kubota; Hiroshi Maru, both of Tokyo, Japan

[73] Assignee: Nippon Mining Co., Ltd., Tokyo, Japan

[21] Appl. No.: 552,507

[22] Filed: Jul. 16, 1990

[30] Foreign Application Priority Data

Jul. 18, 1989 [JP] Japan ................................. 1-183553
Oct. 23, 1989 [JP] Japan ................................. 1-273658

[51] Int. Cl.$^5$ ............................................. G01L 23/22
[52] U.S. Cl. ......................................... 73/35; 374/144
[58] Field of Search ........................ 73/35; 374/131, 144

[56] References Cited

U.S. PATENT DOCUMENTS

| | | | |
|---|---|---|---|
| 4,265,205 | 5/1981 | Garcea | 73/35 |
| 4,397,176 | 8/1983 | Rohde et al. | 73/35 |
| 4,444,043 | 4/1984 | Hattori et al. | 73/35 |
| 4,576,486 | 3/1986 | Dils | 374/131 |
| 5,052,214 | 10/1991 | Dils | 73/35 |

FOREIGN PATENT DOCUMENTS

| | | |
|---|---|---|
| 0058390 | 8/1982 | European Pat. Off. . |
| 3042399 | 6/1982 | Fed. Rep. of Germany . |
| 3106993 | 9/1982 | Fed. Rep. of Germany . |

OTHER PUBLICATIONS

"An introduction to Optical Fiber Thermometer Measurements in Automotive Engines," by R. R. Dils and M. P. Moore, *Advances in Instrumentation*, vol. 41, 1986, reprinted Feb. 1988.

*Primary Examiner*—John E. Chapman
*Attorney, Agent, or Firm*—Stevens, Davis, Miller & Mosher

[57] ABSTRACT

An apparatus for detecting an operating condition of an internal-combustion engine, particularly a knocking condition of a four stroke cycle gasoline engine including a black body light radiating member formed by an opaque film of a noble metal, a sapphire rod which is arranged to be inserted into a hole formed in an engine head block, the black body light radiating member being arranged on one end of the sapphire rod such that the black body light radiating member is positioned within a combustion chamber, an optical fiber having one end optically coupled with the other end of the sapphire rod, a light detector arranged to receive light emanating from the other end of the optical fiber to produce a temperature signal which represents the heat flux within the combustion chamber, and a signal processing circuit for processing the temperature signal to detect the operating condition of the engine. The signal processing circuit is constructed to detect the operating condition by deriving at least one of the following parameters: a peak value of the temperature signal, a peak value of a derivative of the temperature signal and a timing of the peak of the derivative of the temperature signal.

4 Claims, 11 Drawing Sheets

FIG_1

FIG_2

FIG_5c

FIG_7

FIG_8

FIG_9

FIG_10

APPARATUS FOR DETECTING OPERATING CONDITION OF INTERNAL-COMBUSTION ENGINE

BACKGROUND OF THE INVENTION

Field of the Invention and Related Art Statement

The present invention relates to an apparatus for detecting or sensing an operating condition of an internal-combustion engine, and more particularly to an apparatus for detecting an abnormal combustion such as so-called knocking of an internal-combustion engine having ignition plugs.

Nowadays various types of internal-combustion engines are installed in automobiles. One, the most widely used engine, is a four stroke cycle gasoline engine having ignition plugs. In this gasoline, engine, in order to improve the output power characteristic and fuel economy of the engine, the ignition timing is advanced with respect to the top dead center by such an angle that the maximum torque can be obtained. In general, such an advanced ignition timing is called minimum advance for best torque (M.B.T.) However, M.B.T., i.e., the most suitable ignition timing or the latest ignition timing for obtaining maximum torque under the same running conditions, varies in accordance with running conditions of the automobile and operating conditions of the engine. For instance, in a relatively slow engine revolution range, a threshold ignition timing at which the knocking or detonation might occur lies at a position which is delayed with respect to the M.B.T., so that if the ignition timing is set at M.B.T., knocking occurs and the output power and fuel consumption are deteriorated. In view of the above it has been earnestly desired to develop an apparatus which can sense the occurrence of abnormal conditions of the engine, particularly knocking, accurately.

In Japanese Patent Application Publication No. 5154/41, there is disclosed a known knocking sensor comprising a pressure sensor such as a piezoelectric element. The piezoelectric element is shaped as a washer and is installed in an ignition plug to sense pressure variation within a combustion chamber of the engine. An electric signal generated by the piezoelectric element is supplied by means of an electric conductor to a signal processing circuit in which the pressure variation is detected.

There has been proposed another knocking sensor which comprises a vibration sensor formed by a piezoelectric element. An electric signal generated by the vibration sensor is supplied to a plurality of filter circuits to detect signal components corresponding to abnormal vibration due to knocking, and the thus extracted signal components are further processed by a circuit for judging knocking.

In the above mentioned known knocking sensor utilizing the pressure sensor, the pressure sensor is arranged in the combustion chamber to detect the pressure variation within the combustion chamber. In the known knocking sensor using the vibration sensor, the vibration sensor is provided on an engine block. Therefore, the sensors detect pressure variations or vibrations caused by various factors other than the combustion of the fuel within the combustion chamber. This results in that the electric signal generated by the sensor has very low S/N. Further the electric signal generated by the sensor is derived by means of an electric conductor to the signal processing circuit which is usually provided remote from the engine. It is apparent that noise might be introduced into the electric signal, while it is transmitted through the electric conductor. This results in further decrease in S/N. In this manner, in the known knocking sensors, S/N of the detected signal is very low, and thus the detected signal has to be processed by means of a very complicated signal processing circuit. Therefore, the signal processing circuit is liable to be complicated in construction and expensive in cost. Moreover, the complicated signal processing requires a longer time, which limits the response of the knocking detection. In order to control ignition timing in a real time mode in accordance with the detected engine condition, it is necessary to make the response as fast as possible.

SUMMARY OF THE INVENTION

The present invention has for its object to provide a novel and useful apparatus for detecting the operating conditioned of an internal-combustion engine without being affected by various noises.

It is further object of the invention to provide an apparatus for detecting the operating condition of the internal-combustion engine with a high response.

It is another object of the invention to provide an apparatus for detecting knocking of the internal-combustion engine accurately.

It is still another object of the present invention to provide an apparatus for detecting not only the occurrence of knocking, but also the degree of knocking.

According to the invention, an apparatus for detecting an operating condition of an internal-combustion engine comprises:
 a black body light radiating member arranged within a combustion chamber of an internal-combustion engine and radiating light energy whose intensity is in proportion to a heat flux flowing therethrough;
 a light propagating member having one end to which the black body light radiating member is optically coupled and the other end;
 a supporting member for supporting said light guide member such that said black body light radiating member is situated at a position within the combustion chamber;
 a light detecting member arranged to receive the light energy radiated by said black body light radiating member, propagated along said light propagating member and emanated from the other end of the light propagating member and converting the received light energy into a temperature signal representing a temperature sensed by said black body light radiating member; and
 a signal processing circuit for processing the temperature signal supplied from said light detecting member to detect the operating condition of the internal-combustion engine.

There are various factors which cause an abnormal combustion such as detonation and knocking of the internal-combustion engine. For instance, in the knocking condition, self-ignition of a mixed gas of fuel and air occurs near a cylinder head block toward which a flame propagating face travels and the flame propagating speed is increased abruptly. These factors may be considered to cause abrupt combustion which ends within a very short time period as compared with the normal combustion. Due to these factors, in the abnormal combustion, the heat flux is increased abruptly and locally. That is to say, when the flame propagating speed is increased abruptly, the heat flux is increased within a short time period and the heat flux is abruptly increased near the wall of the combustion chamber, an abnormal pressure wave or shock wave is produced within the combustion chamber. The shock wave thus induced in the combustion chamber impinges upon the inner wall of the combustion chamber to produce knocking. It can be considered that a total amount of heat generated in the combustion chamber is constant regardless of the occurrence of the knocking. In the normal combustion, the flame which is first generated near the ignition plug propagates toward the opposite wall of the combustion chamber at a relatively slow speed, so that the normal combustion can be regarded as a stable combustion which lasts for a relatively long time. In the knocking, there is produced an abrupt combustion which ends within a very short time. The generated heat is radiated to the wall of the combustion chamber, so that it can be said that in the normal combustion dQ/dt is relatively small and thus the heat flux has a low density. On the contrary, in the detonation dQ/dt is relatively high and there is produced a heat flux having a high density. Therefore, by detecting the heat flux generated during the combustion it is possible to detect the operating condition of the internal-combustion engine accurately spontaneously and reliably.

DESCRIPTION OF THE PREFERRED EMBODIMENTS

Figure 1:
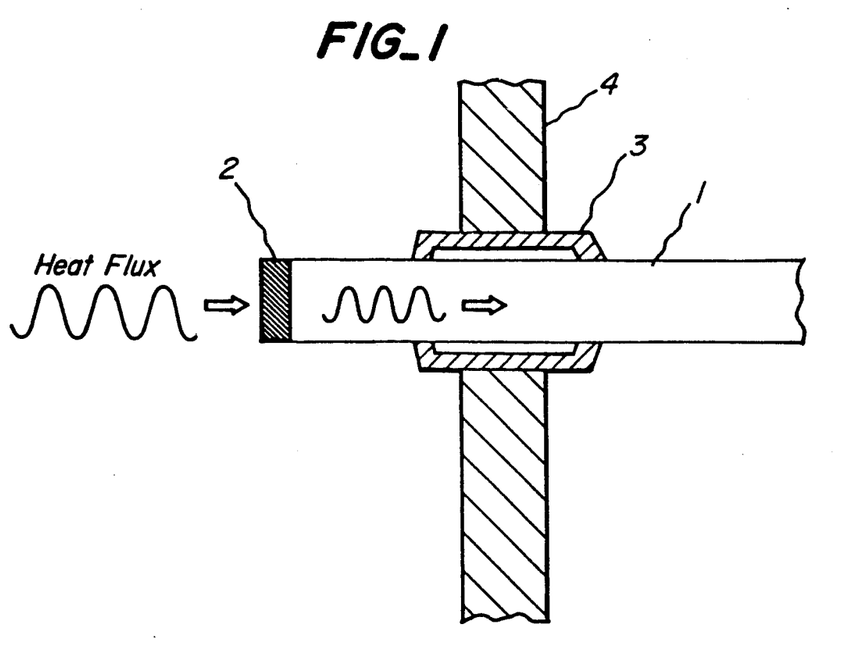
FIG. 1 is a schematic view showing a heat flux sensor of the apparatus according to the invention.

FIG. 1 shows a heat flux sensor of the engine operating condition detecting apparatus according to the invention. The heat flux sensor can detect the variation of the heat flux generated within a combustion chamber of internal-combustion engine such as a gasoline engine. According to the invention, the heat flux sensor comprises an opaque black body whose temperature varies quickly in accordance with the heat flux passing therethrough. The heat flux sensor comprises a light propagating member 1 and a black body 2 applied on an end of the light propagating member 1. When the black body 2 is heated, it radiates light whose intensity is proportional to the temperature of the black body, so that in the present specification, the black body 2 is called a black body light radiating member. The black body light radiating member 2 and the light propagating member 1 is fixed to a wall 4 forming a combustion chamber 5 by means of a supporting member 3. It is assumed that when a fuel mixed with air is burnt within the combustion chamber 5, there is produced heat of $Q_{gas}$. Then, the heat flux can be represented as $Q_{gas}/A$, Where A is a cross sectional area of the combustion chamber 5 through which area the heat flux propagates. The black body light radiating member 2 is subjected to the heat flux, so that the thermal energy is transferred from the heat flux to the black body light radiating member. Then the temperature of the black body light radiating member 2 is increased in proportion to the induced heat flux and radiates light energy whose intensity is proportional to the temperature of the black body light radiating member. Therefore, if it is assumed that heat flux pulses having a given repetition frequency are made incident upon the black body light radiating member 2, the light energy radiated by the black body light radiating member has the same frequency as said repetition frequency. The thus radiated light energy is taken out of the combustion chamber 5 by means of the light propagating member 1. Then the light energy propagated along the light propagating member 1 is detected by a light detector arranged outside the engine to convert an electric signal which represents the variation of the heat flux which denotes the temperature variation within the combustion signal in the instant specification. Then the thus generated temperature signal is processed by a signal processing circuit to detect the temperature variation within the combustion chamber during the combustion. From the thus detected temperature variation it is possible to detect the variation of the heat flux in each of the combustion cycles. In this manner, according to the invention the operating condition of the internal-combustion engine is detected by sensing the temperature variation within the combustion chamber during the combustion.

Figure 2:
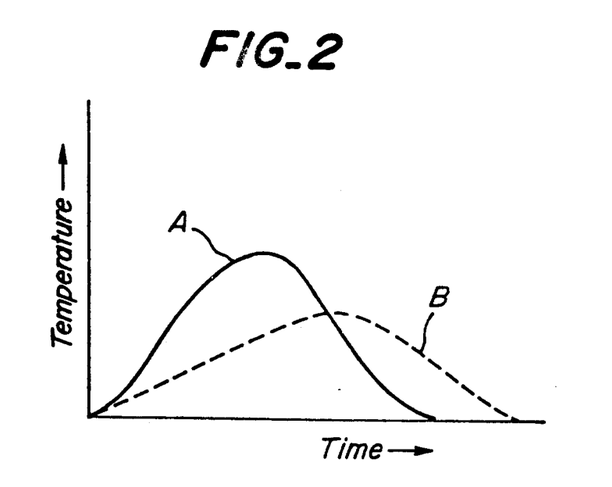
FIG. 2 is a graph illustrating the temperature variation in the normal combustion and abnormal combustion.

FIG. 2 represents a graph illustrating typical temperature variations of the black body light radiating member 2 when high and low density heat fluxes are made incident thereupon. A horizontal axis denotes a time and a vertical axis the temperature of the black body light radiating member. A solid curve A represents a case when the high density heat flux is made incident upon the black body light radiating member 2 and a broken curve B denotes the temperature variation in case the low density heat flux impinges. When the heat flux pulse is made incident on the black body light radiating member 2, the heat Q transferred from the heat flux to the black body light radiating member is determined as a product of a temperature difference between the heat flux and the black body and a heat transfer function which relates to the propagating speed and pressure of the burning gas. Therefore, the heat transferred to the black body light radiating member 2 may be considered to be dependent on the heat flux. When the high density heat flux pulse is made incident upon the black body light radiating member 2, the temperature of the radiating member 2 increases abruptly and reaches a peak temperature within a very short time. When a low density heat flux pulse is made incident upon the radiating member 2, its temperature increases gradually and a peak temperature is lower than the peak temperature in case of the high density heat flux pulse. Therefore, the heat flux density, i.e., the burning condition within the combustion chamber, can be sensed by detecting at least one of a peak value of the temperature, a derivative of the temperature in the time domain and timings at which the temperature and derivative thereof attain their peak values. According to the invention, the operating condition of the internal-combustion engine, and particularly knocking, can be detected by arranging the black body light radiating member 2 within the combustion chamber, detecting the light energy radiated by the light radiating member with the aid of the light detector and processing the electric signal generated by the light detector. Since use is made of the black body radiating the light energy whose intensity is proportional to the density of the heat flux, and the light energy is not influenced by external factors such as vibration of the engine itself, the operating condition of the engine including the knocking can be detected accurately without using a complicated signal processing circuit. Further the light energy generated by the black body light radiating member can be easily guided by means of the light propagating member such as an optical fiber to any suitable point outside the engine, and the light energy is hardly affected by noise during the propagation. Further the optical temperature sensor using the black body light radiating member absorbs the light energy almost 100% and has a very small heat capacitance, so that it can responds to a very high temperature variation such as several tens KHz. Moreover such a temperature sensor has an extremely high resolution such as 0.01° C., so that the operating condition of the engine can be precisely sensed even at a high engine revolution.

Figure 3:
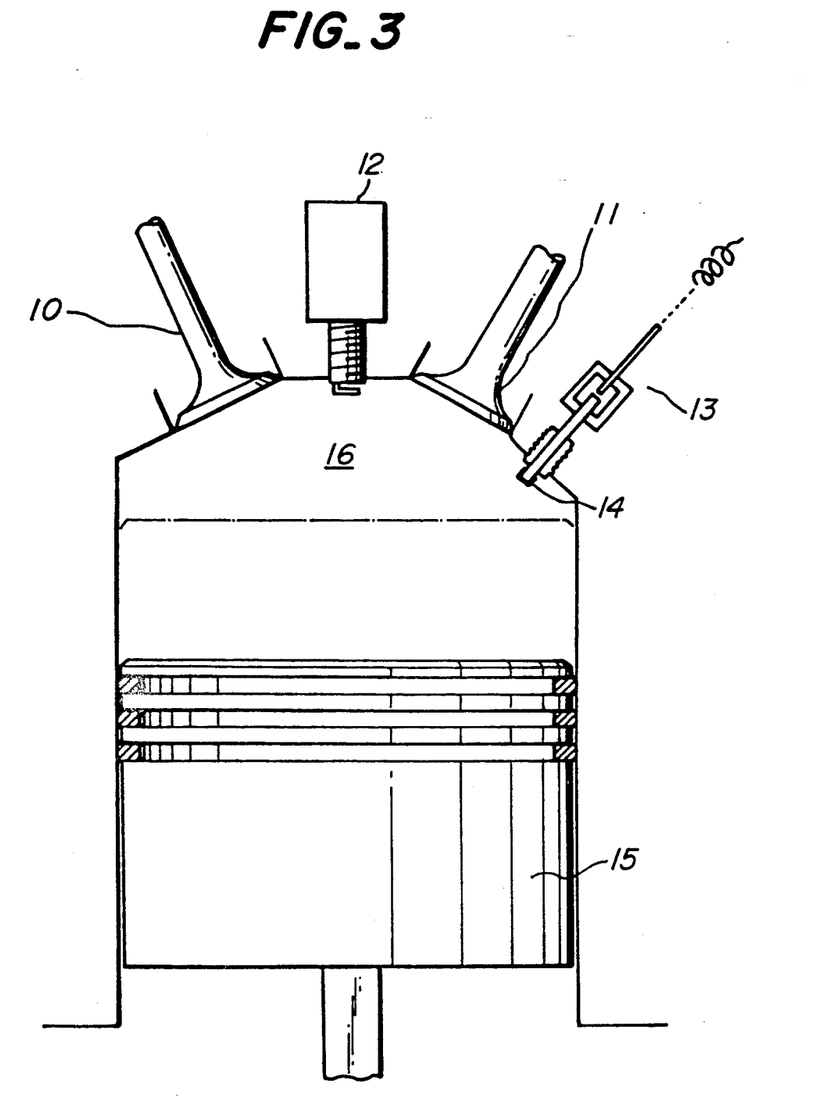
FIG. 3 is a cross section depicting the arrangement of the heat flux sensor within the cylinder head block.

FIG. 3 is a schematic view illustrating an embodiment of the temperature sensor of the apparatus for detecting the operating condition of the engine according to the invention. In the present embodiment, the knocking of a four stroke cycle gasoline engine is to be detected. On a cylinder head block are provided intake valve 10, exhaust valve 11 and ignition plug 12. An optical temperature sensor 13 according to the invention is provided in a wall of the cylinder head block such that a black body light radiating member 14 is positioned within a combustion chamber 16. The black body light radiating member 14 is advantageously provided near the top dead center of a piston 15 and remote from the ignition plug 12 as far as possible. By arranging the black body light radiating member 14 remote from the ignition plug 12, it is possible to detect the condition of the heat flux accurately.

Figure 4:
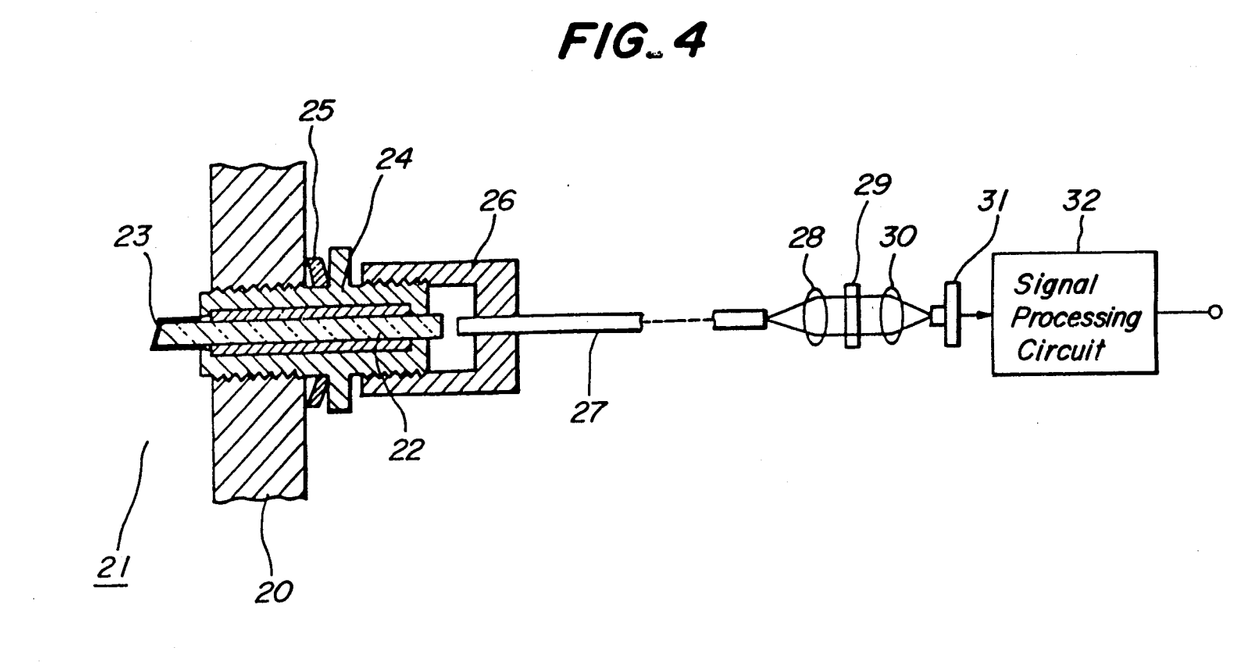
FIG. 4 is a partial cross section showing the construction of an embodiment of the apparatus according to the invention.

FIG. 4 is a partial cross section showing the whole construction of the apparatus according to the invention. As explained above the optical temperature sensor is arranged to be inserted into a hole formed in a wall 20 of a cylinder head block and a front end of the sensor is protruded into a combustion chamber 21. The sensor comprises a rod-shaped light guide member 22 made of heat resistant transparent material such as sapphire. To a front end of the sapphire rod 22 is applied a black body light radiating member 23 which may be formed by an opaque layer of high melting point metal such as platinum and rhodium. Such a noble metal layer may be formed by sputtering and may have a thickness of about several micron meters. It has been experimentally confirmed that the black body light radiating member 23 is preferably separated from the inner surface of wall 20 by at least 5 mm in order to detect the density of the heat flux accurately without being influenced by the boundary layer existing near the wall. The sapphire rod 22 is supported by a supporting member 24 made of metal such as stainless steel. The supporting member 24 is screwed into a thread hole formed in the wall 20 while a washer 25 is inserted between the wall 20 and a flange formed in the supporting member 24, and in an outer surface of the supporting member is formed a thread, on which is secured an optical connector 26 such that an optical fiber 27 is optically coupled with the sapphire rod 22. When the ignition plug 12 is fired, at first a mixture gas of gasoline and air near the ignition plug is burnt and a flame propagates toward an opposite wall. Since the black body light radiating member 23 is arranged far away from the ignition plug, the flame arrives at the black body light radiating member at the latest timing after the ignition. Upon the progress of the propagation of the flame, the burning gas i.e. the heat flux arrives at the surface of the black body light radiating member 23 and its temperature increases in accordance with the condition of the heat flux. Since the black body light radiating member 23 is formed by the thin layer of the noble metal, it responds to the temperature variation of the heat flux quickly. When the black body light radiating member 23 is heated, it radiates the light energy whose intensity is proportional to the density of heat flux. The thus radiated light propagates through the rod-shaped light guide 22 and optical fiber 27. At an exit end of the optical fiber 27 are arranged lens 28, filter 29 and lens 30 and a light component within a given wavelength range determined by the filter 29 is selectively made incident upon a light detector 31. Then the light detector 31 converts the received light energy into an electric signal. As explained above, the black body light radiating member 23 radiates the light energy having the strength proportional to the generated heat flux, so that the output electric signal from the light detector represents the density of heat flux which represents the burning condition within the combustion chamber. The electric signal thus derived from the light detector 31 is supplied to a signal processing circuit 32 in which the electric signal is processed in a manner which will be explained later to detect the Next several experimental examples conducted by the apparatus for detecting the operating condition of the engine according to the invention will be explained. Experiments were conducted under the following conditions.

| 1) engine: | four stroke cycle single cylinder gasoline engine of 500 cc |
|---|---|
| 2) revolution: | 1500 rpm |
| 3) Operating condition of engine was changed by adjusting octane number of fuel and ignition angle | |
| 3-1) normal combustion | |
| octane number: | 100 |
| ignition angle: | −8° |
| compression ratio: | 7.6 |
| 3-2) slight knocking | |
| octane number: | 100 |
| ignition angle: | −15° |

| -continued | |
|---|---|
| compression ratio: | 7.0 |
| 3-3) heavy knocking | |
| octane number: | 80 |
| ignition angle: | −15° |
| compression ratio: | 7.0 |

The output signal generated by the light detector 31 was differentiated in a time domain to derive a derivative thereof. At the same time, a vibration sensor was provided on the engine block to detect the vibration of the engine block. Further use was made of a sensor for detecting a crank angle.

Figure 5A:
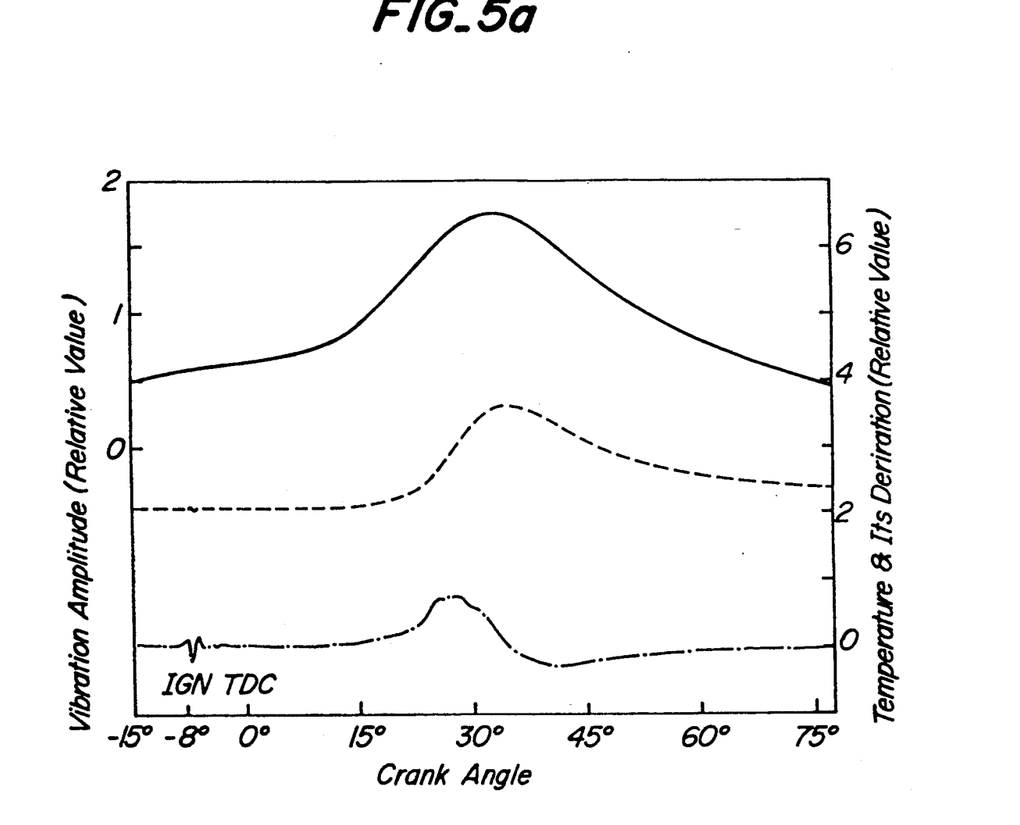
FIGS. 5a, 5b and 5c show the vibration variation, temperature variation and its derivative for various operating conditions of the engine.
Figure 5B:
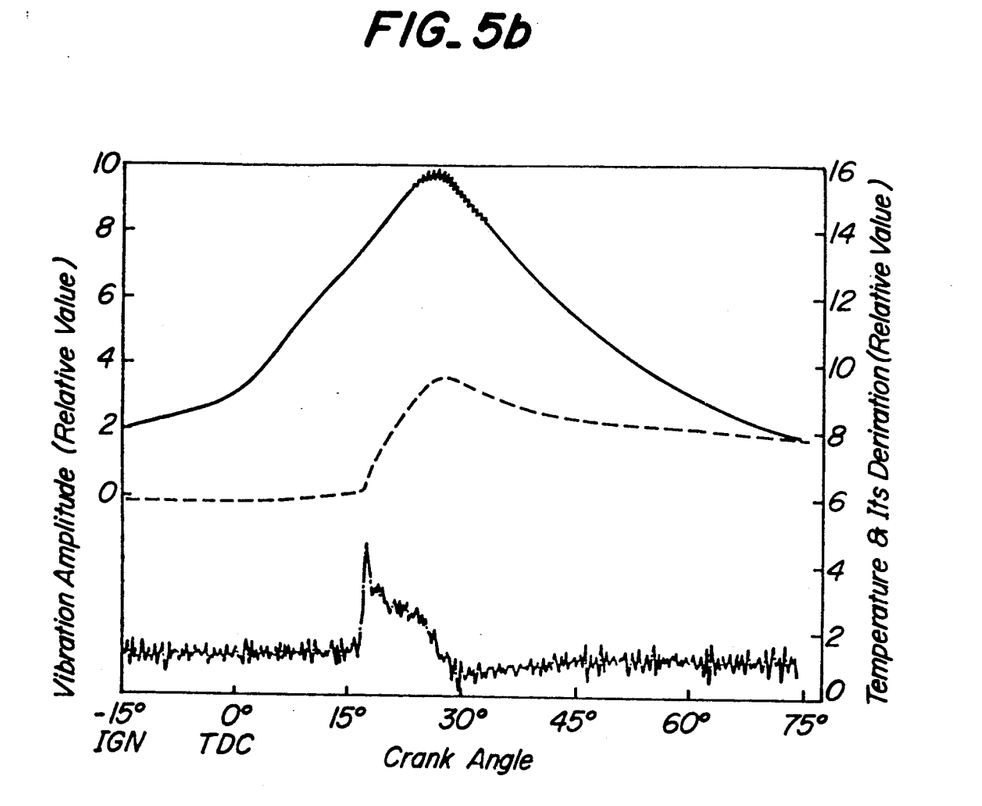
Figure 5C:
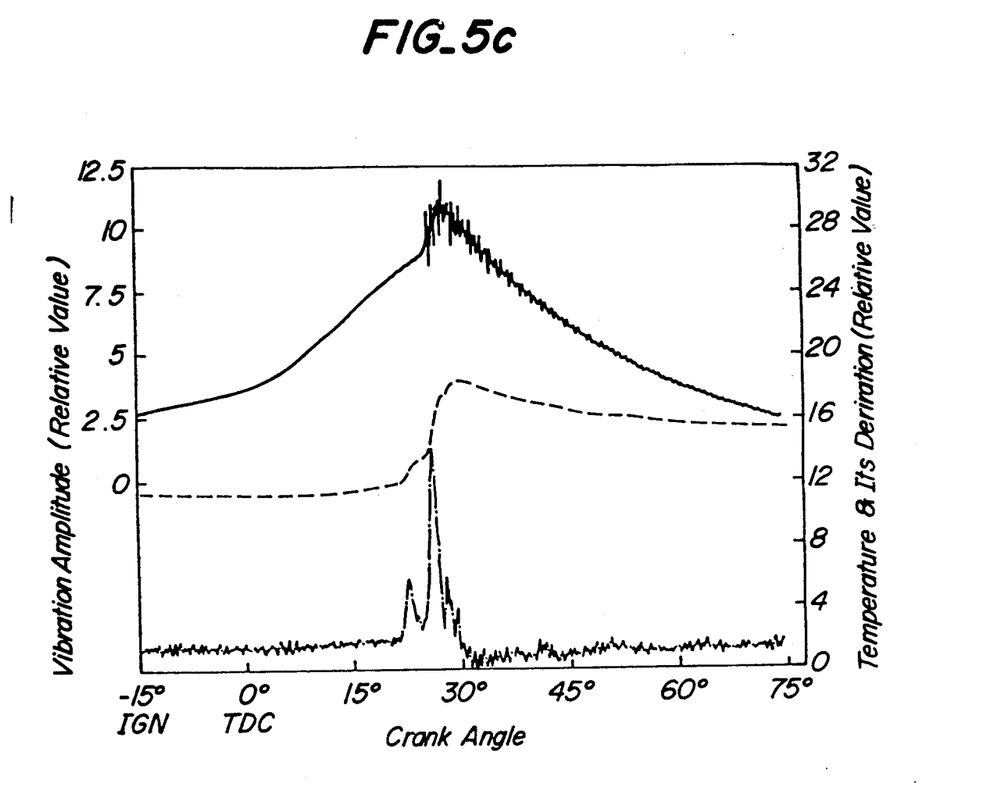

FIG. 5a shows results of the measurement in case of normal combustion, FIG. 5b in case of light knocking such that the knocking noise could not be perceived by the ear, and FIG. 5c in the case of heavy knocking in which knocking noise could be heard. In these figures the uppermost solid curves denote the amplitude of detected vibration, the middle broken curves the temperature variation detected by the optical temperature sensor according to the invention and the lowermost chain curves represent the derivative of the temperature variation. It should be noted that these values are expressed as relative values. The horizontal axis of these graphs shows the crank angle in degrees. TDC denotes the top dead center and IGN represents the ignition timing. In the normal combustion shown in FIG. 5a, after ignition the amplitude of the vibration gradually increases from the crank angle of 15°, arrives at a peak amplitude at the crank angle of about 32° and then decreases slowly. The temperature of the black body light radiating member also increases gradually in a similar manner to the vibration amplitude and arrives at a peak temperature at the crank angle of 34°. After that the temperature decreases gradually. The derivative of the temperature variation also increases gradually up to a peak value and then decreases gradually.

In the light knocking condition illustrated in FIG. 5b, the vibration shows a high frequency component which is inherent to the knocking. That is to say, the shock wave impinges on the inner wall of the cylinder head block. The temperature of the black body light radiating member increases abruptly and the temperature peak is higher than that of the normal combustion by 2.4 times. Further the derivative increases sharply.

In the heavy knocking condition shown in FIG. 5c, a large high frequency vibration occurs near the peak amplitude of vibration and the temperature of the black body light radiating member increases very abruptly and its peak value is 4.5 times higher than the normal peak value. The peak of the derivative becomes much more steep. Further it should be noted that the timing at which the temperature derivative becomes maximum is advanced in the knocking condition as compared with the normal condition. The above experimental results will be shown in the following table.

TABLE 1

| | Peak temperature | Derivative |
|---|---|---|
| Normal | 1 | 1 |
| Light knocking | 2.4 | 4.6 |
| Heavy knocking | 4.5 | 18.0 |

As can be read from the above table 1, the peak value of the temperature increases in accordance with the degree of the knocking and the derivative of the temperature variation also increases abruptly in proportion to the degree of the knocking. Therefore, the occurrence of the knocking and the degree of the knocking can be detected by detecting at least one of the temperature of the black body light radiating member arranged within the combustion chamber and derivative of the temperature variation. As explained above, the operating condition of the engine relates to a timing at which the peak of the time derivative of the temperature variation occurs, so that it is also possible to detect the occurrence of the knocking by detecting the peak timing of the derivative of the temperature variation. Moreover, the peak value of the temperature represents the degree of knocking, so that the peak value of the temperature may be utilized to detect the operating condition of the engine. Similarly the derivative of the temperature variation has the correlation with the degree of the knocking, so that the peak value of the derivative may be used to detect the knocking condition.

Figure 6:
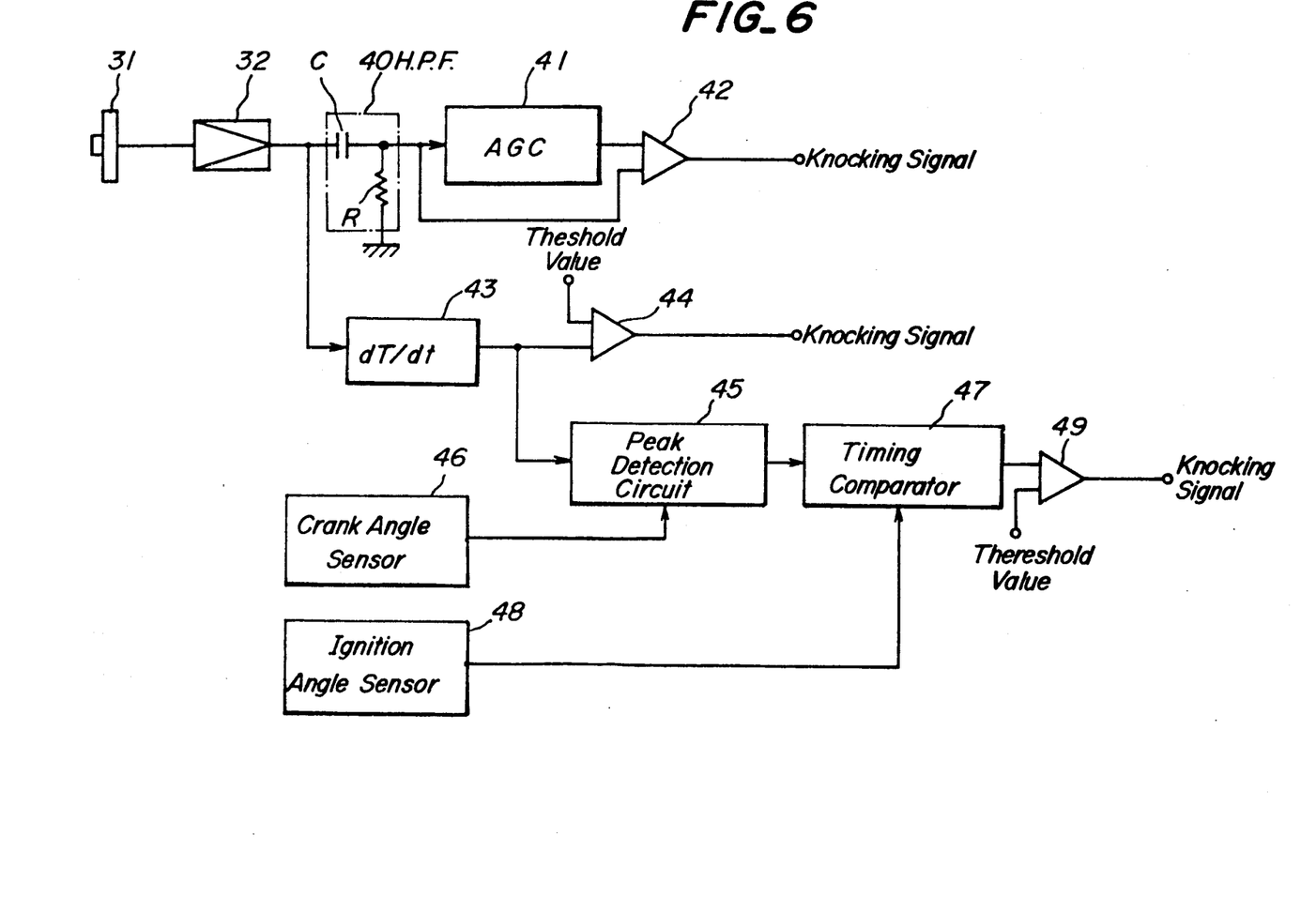
FIG. 6 is a block diagram illustrating an embodiment of the signal processing circuit according to the invention.

FIG. 6 is a block diagram showing an embodiment of the signal processing circuit of the knocking detecting apparatus according to the invention. The temperature signal supplied from the light detector 31 is first amplified by an amplifier 32 and then is passed through a high pass filter (H.P.F.) 40 formed by capacitance C and resistance R to cut a low frequency component lower than 0.01 Hz. By this measure the fluctuation of the base level of the temperature signal can be removed. The signal is then supplied to an automatic gain control (A.G.C.) circuit 41 and an output signal from A.G.C. is supplied to a reference input of a first comparator 42. To the other input of the first comparator 42 is supplied the output signal from the high pass filter 40. The output of A.G.C. circuit 41 may be considered to be a reference signal, so that when the output from the high pass filter 40 is larger than the output of the automatic gain control circuit 41, it can be judged that the temperature increases abruptly and thus knocking occurs. Then the first comparator 42 produces a first knocking signal. The output of the amplifier 32 is also supplied to a differentiating circuit 43 to derive a derivative of the temperature variation in a time domain. The derivative signal thus produced is supplied to a second comparator 44 and is compared with a predetermined threshold value. When the derivative signal exceeds the threshold value, it can be judged that the knocking occurs and the second comparator generates a second knocking signal. The derivative signal generated by the differentiating circuit 43 is further supplied to a peak detection circuit 45 in which a timing of the peak of the derivative is detected with reference to a crank angle signal supplied from a crank angle sensor 46. The peak timing signal detected by the peak detection circuit 45 is supplied to a timing comparator 47 and is compared with an ignition timing supplied from an ignition angle sensor 48. An output signal generated by the timing comparator 47 is supplied to a third comparator 49 and is compared with a predetermined threshold value. When the peak of the derivative of the temperature variation appears at a timing which is advanced with respect to a given timing related to the threshold value supplied to the third comparator 49, the third comparator generates a third knocking signal. In this manner, according to the invention knocking can be detected with the aid of the signal processing circuit having a simpler construction. It should be noted that in the signal processing circuit shown in FIG. 6, there are produced the three knocking signals from the three comparators 42, 44 and 49, but in actual signal processing circuit it is not always necessary to produce all the three knocking signals and it is sufficient to generate at least one of the three knocking signals. Further these three knocking signals may be further supplied to an OR gate or an AND gate. When an OR gate is used, at least one of the three knocking signals results in a final knocking signal, and when an AND gate is utilized, the final knocking signal is produced only when all the three knocking signals appear simultaneously.

Figure 7:
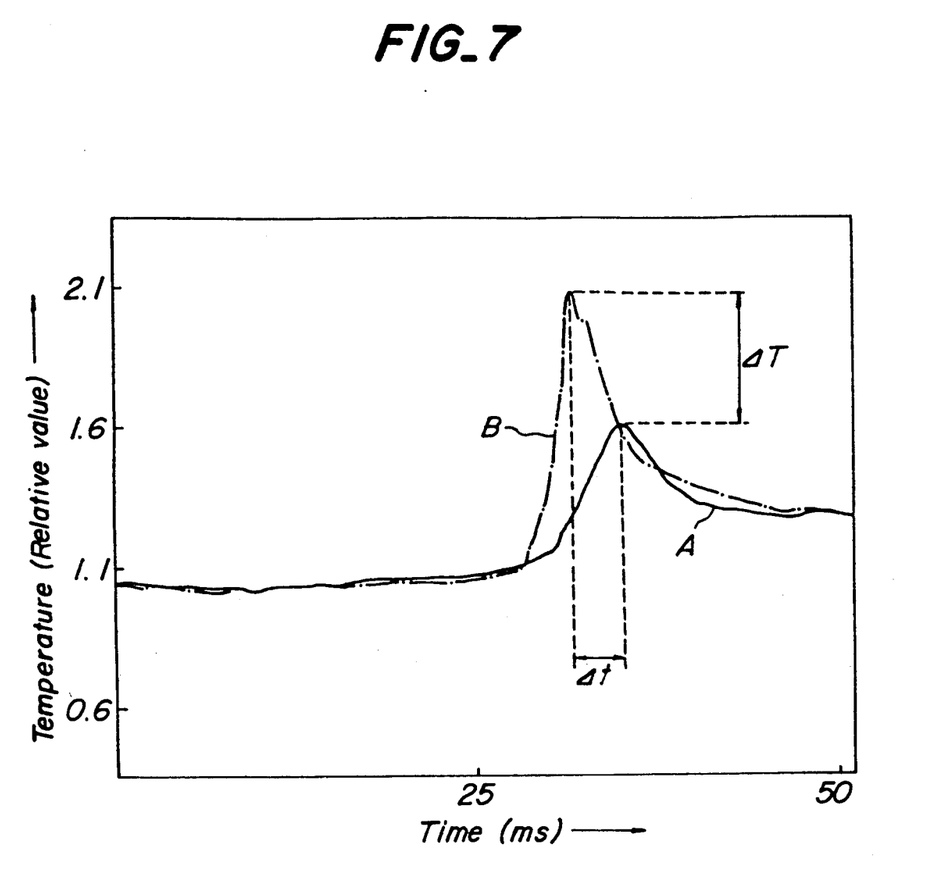
FIG. 7 shows graphs of the typical temperature variation in the normal and abnormal conditions.

FIG. 7 shows a typical graph showing the variation of the temperature. A horizontal axis denotes time in milliseconds. A curve A represents the temperature variation in normal combustion and curve B the knocking condition. As explained above, when knocking occurs, the peak value of the temperature becomes higher than that in the normal combustion and at the same time the timing at which the peak of the temperature in the knocking condition is advanced with respect to that in the normal combustion. Therefore, a difference $\Delta T$ in the peak values as well as a difference $\Delta t$ in the timings of the peaks between the normal condition and the knocking represent the operating condition of the engine such as the degree of the knocking. According to the invention, the operating condition of the engine may be sensed by detecting the above mentioned $\Delta T$ and $\Delta t$.

Figure 8:
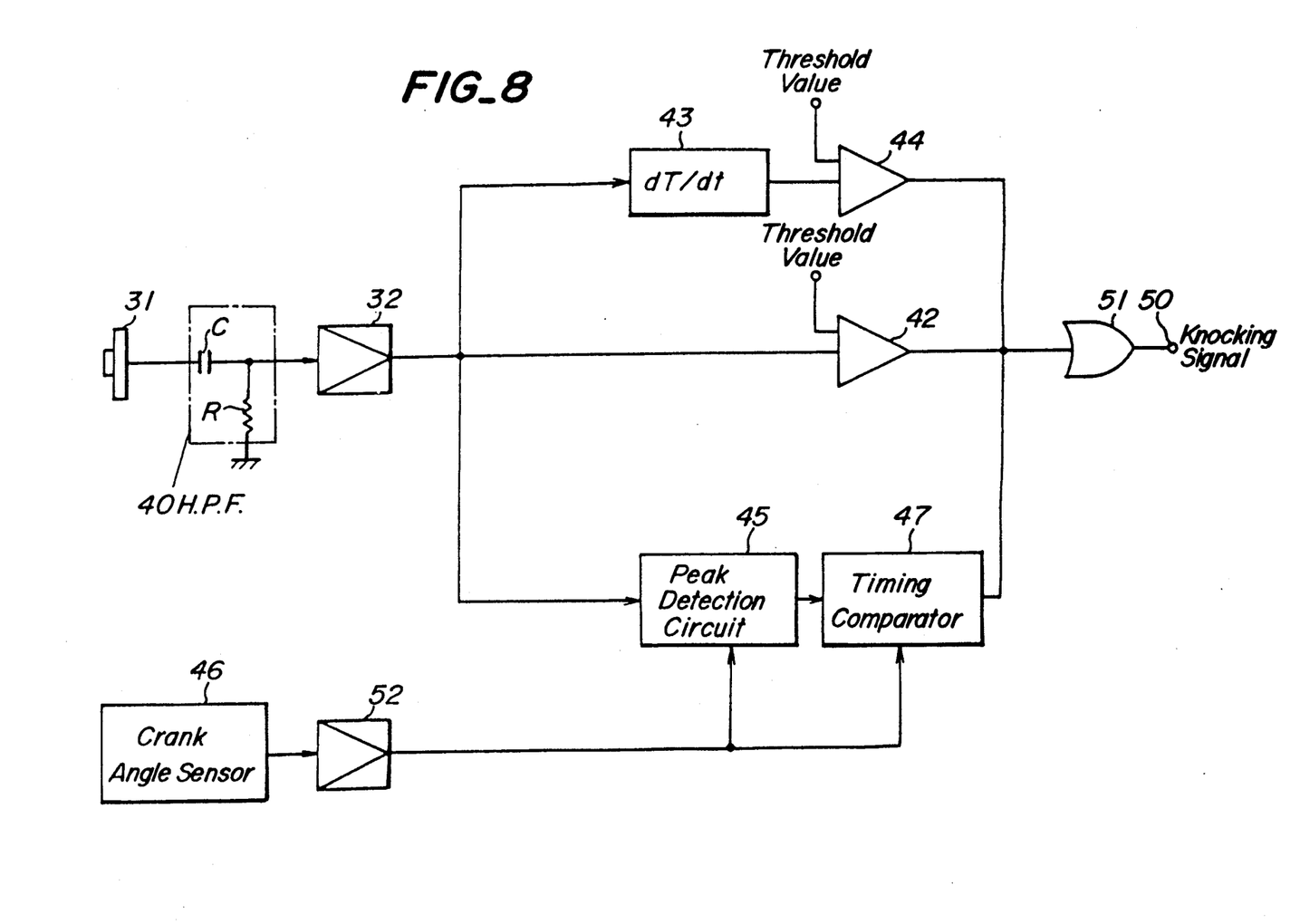
FIG. 8 is a block diagram illustrating another embodiment of the signal processing circuit according to the invention.

FIG. 8 is a block diagram illustrating another embodiment of the apparatus according to the invention, in which the peak value of the derivative of the temperature variation and $\Delta T$ and $\Delta t$ are detected to measure the operating condition of the engine. In the present embodiment, portions similar to those shown in FIG. 6 are denoted by the same reference numerals used in FIG. 6. An output signal generated by a light detector 31 is first passed through a high pass filter 40 formed by capacitance C and resistance R to remove the slow variation of the temperature having frequency components lower than 0.01 Hz. The output signal of the high pass filter 40 is amplified by an amplifier 32 and is then supplied to a differentiating circuit 43, comparator 42 and peak detection circuit 45. In the comparator 42 the amplitude of the temperature signal is compared with a threshold value and when the temperature exceeds a threshold temperature determined by the threshold value, a knocking signal is generated. The knocking signal thus produced is supplied to an output terminal 50 by means of OR gate 51. In the differentiating circuit 43 the temperature signal is differentiated in time to derive a derivative of the temperature variation. This derivative is supplied t a comparator 44 and is compared with a threshold value. When knocking occurs, the derivative of the temperature variation becomes large and the comparator 42 produces a knocking signal which is supplied to the output terminal 50 via OR gate 51.

Further the temperature signal is supplied to a peak detection circuit 45. To the peak detection circuit 45 is further supplied a crank angle detection signal from a crank angle sensor 46 via an amplifier 52. The peak detection circuit 45 detects a timing at which the peak of the temperature occurs. The timing signal thus detected is then supplied to a timing comparator 47. In the timing comparator 47, the timing of the peak of the temperature is compared with a threshold timing which can be determined with reference to the top dead or bottom dead center detected by the crank angle sensor 46. When the timing of the peak of temperature is advanced with respect to the threshold timing, the timing comparator 47 generates the knocking signal which is then supplied to the output terminal 50 via OR gat 51. In the present embodiment, when at least one of the amplitude of the temperature signal, derivative of the temperature signal and the timing of the peak of the temperature signal exceeds a corresponding threshold value, there is produced the knocking signal at the output terminal 50. According to the invention it is also possible to replace OR gate 51 by AND gate. Then, the knocking signal is generated only when all of the above-mentioned three parameters exceed particular thresholds.

Figure 9:
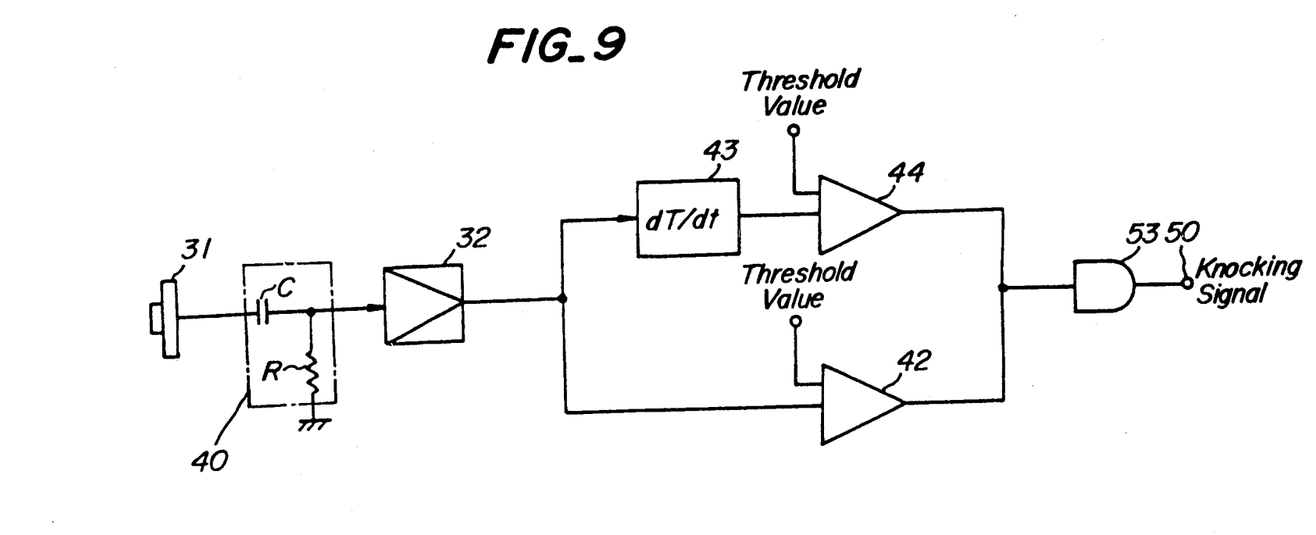
FIG. 9 is a block diagram depicting another embodiment of the signal processing circuit according to the invention.

FIG. 9 is a block diagram showing another embodiment of the apparatus according to the present invention. Also in the present embodiment, portions similar to those of the previous embodiments are represented by the same reference numerals and their detailed explanation is dispensed with. In the present embodiment, the temperature signal amplified by the amplifier 32 is supplied to the differentiating circuit 43 and the comparator 42. The derivative signal generated by the differentiating circuit is supplied to the comparator 44. The output signals supplied from the comparators 42 and 44 are supplied to AND gate 53. Therefore, when both the comparators 42 and 44 generate produced at the output 50. In the present embodiment, any malfunction due to sudden noise can be avoided.

Figure 10:
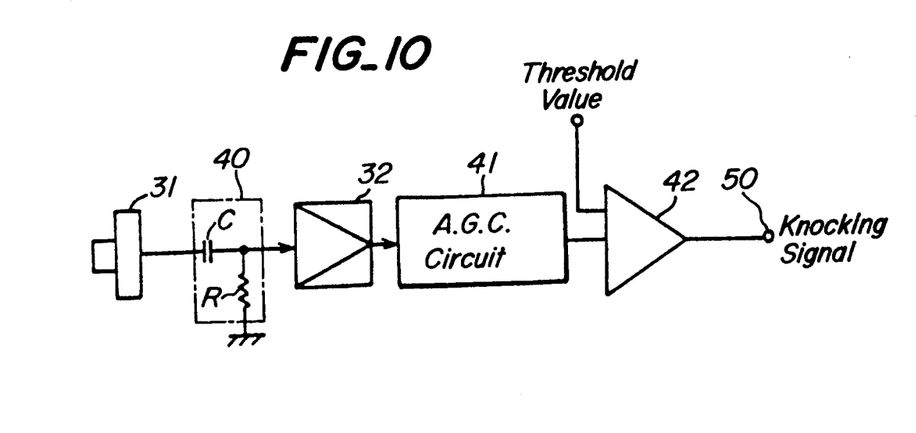
FIG. 10 is a block diagram showing still another embodiment of the signal processing circuit according to the invention.

FIG. 10 shows still another embodiment of the apparatus according to the invention. In the present embodiment, between the amplifier 32 and the comparator 42 is arranged an automatic gain control circuit 41. The A.G.C. circuit 41 serves to control a gain of the temperature signal in such a manner that its output amplitude is kept substantially constant although the amplitude of the input signal changes. Therefore, the output temperature signal supplied from A.G.C. circuit 41 is kept within a predetermined amplitude range, so that the comparison with the threshold value in the comparator 42 can be performed accurately.

Figures 11A, 11B, 11C:
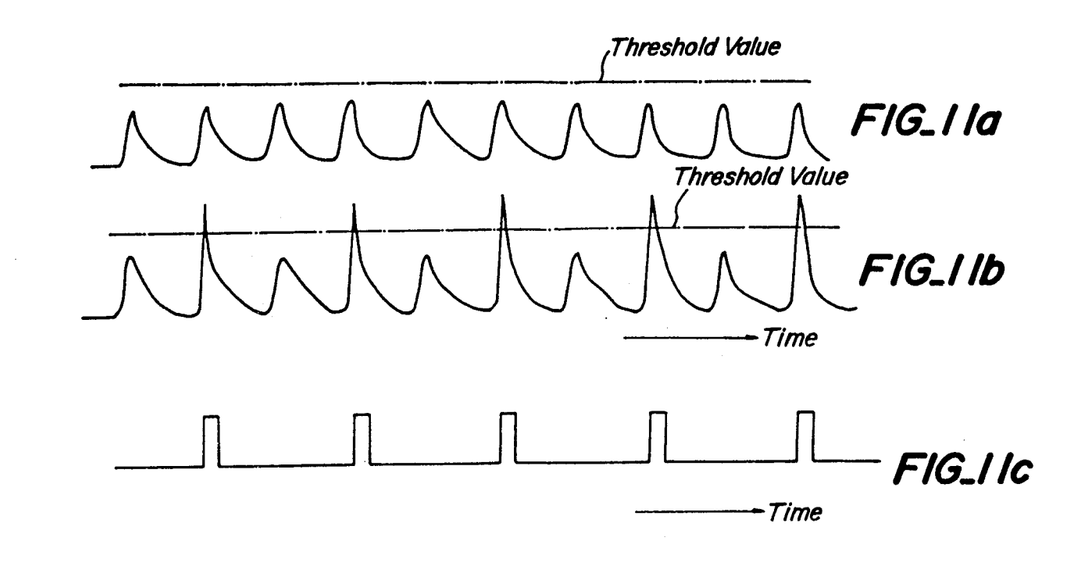
FIGS. 11a, 11b and 11c are signal waveforms for explaining the operation of a signal processing circuit according to the invention.

FIGS. 11a and 11b show the temperature signal supplied from the light detector in the normal combustion condition and knocking condition, respectively. In the normal condition, the temperature signal includes pulses having amplitudes which do not exceed the threshold value. However, in the knocking condition the temperature signal contains large pulses whose amplitude exceeds the threshold value. It has been confirmed that the degree of the knocking is proportional to the number of large pulses per unit time period. Therefore, by counting the number of large pulses per unit time period it is possible to detect the degree of the knocking. Then, the ignition timing is delayed in accordance with the detected knocking degree to bring the ignition timing into the most suitable one.

Figure 12:
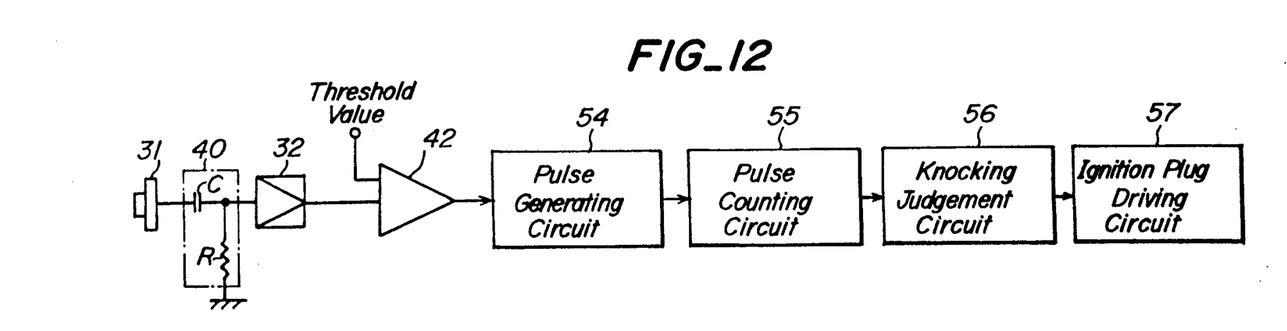
FIG. 12 is an ignition timing control circuit using the apparatus according to the invention.

FIG. 12 is a block diagram showing further embodiment of the apparatus according to the invention in which the ignition timing is controlled in the manner explained above. The temperature signal generated by the light detector 31 is supplied to the comparator 42 via the high pass filter 40 and amplifier 32 and is compared with the threshold value. When the temperature signal exceeds the threshold value, the comparator 42 generates the output signal which is supplied to a pulse generating circuit 54. Then the pulse generating circuit 54 generates pulse shown in FIG. 11c. These pulses are supplied to a pulse counting circuit 55 which counts the number of pulses per unit time period. The output signal of the pulse counting circuit 55 is then supplied to a knocking judgment circuit 56 which determines the degree of the knocking. The output signal of the knocking judgment circuit 56 is further supplied to an ignition plug driving circuit 57 to generate ignition pulses whose timings are controlled in accordance with the output signal from the knocking judgment circuit 56. It should be noted that the repetition period of the pulses generated by the pulse generating circuit 54 varies in accordance with the revolution speed of the engine. It is preferable to effect correction for this variation.

The present invention is not limited to the embodiments explained above, but many modifications and alternatives may be conceived which are within the scope of the invention. For instance, in the above embodiments the knocking condition of the engine is detected, however according to the invention any condition of the engine such as abnormal ignition timing may be equally detected. When the ignition timing is too advanced, the temperature sensed by the black body light radiating member increases abruptly as in the case of knocking, so that such an abnormal condition of the engine can be detected by the same circuit construction as that for detecting the knocking.

The advantages of the present invention may be summarized as follows.

(1) Since the black body light radiating member for detecting the heat flux is arranged in the combustion chamber and the light energy generated by the black body light radiating member is derived out of the engine block by means of the light propagating member, the operating condition of the engine can be detected accurately without being affected by the external noise. Particularly, when the knocking occurs, the heat flux is increased rapidly so that even if the knocking is so slight that it could not be heard, the occurrence of the knocking condition can be detected positively.

(2) Since the degree of the knocking is related to the peak values of the temperature signal and its derivative in a time domain, the ignition timing can be automatically controlled in accordance with these signals.

(3) Since the temperature sensor does not include a movable portion which is contained in the known vibration sensor and pressure sensor, the temperature can be detected precisely without being influenced by the noise and vibration and further the temperature sensor can be used for a very long time.

(4) The temperature sensor utilizing the black body light radiating member is not affected by the external magnetic and electric fields, so that the temperature can be detected at a very high precision. Further, the response of the black body light radiating member is very high and has a frequency response of several tens KHz. Therefore, the operating condition of the engine can be detected precisely.

(5) Since the black body light radiating member of the temperature sensor is formed by an opaque film of high melting point metal, it is not affected by particles such as soot produced within the combustion chamber and can detect the temperature for a very long time without cumbersome maintenance.

(6) The light energy generated by the black body light radiating member can be derived by means of the optical fiber to any desired point outside the engine block. Further, the light energy is hardly influenced during propagation, and thus the temperature can be detected at very high S/N and thus the operating condition of the engine can be detected also at very high S/N.

What is claimed is:

1. An apparatus for detecting an operating condition of an internal-combustion engine, comprising:
a black body light radiating member for being arranged within a combustion chamber of an internal-combustion engine and radiating light energy;
a light propagating member having a first end to which the black body light radiating member is optically coupled and a second end;
a supporting member for supporting said light propagating member such that said black body light radiating member is situated at a position within the combustion chamber;
a light detecting member arranged to receive the light energy radiated by said black body light radiating member, propagated along said light propagating member and emanated from the second end of the light propagating member and for converting the received light energy into a temperature signal representing a temperature sensed by said black body light radiating member; and
a signal processing circuit for processing the temperature signal supplied from said light detecting member to detect the operating condition of the internal-combustion engine, wherein said signal processing circuit comprises a first comparator for comparing the temperature signal with a first threshold value to derive a first knocking signal when the temperature signal exceeds the first threshold value, a differentiating circuit for differentiating said temperature signal int he time domain to produce a derivative signal, a second comparator for comparing said derivative signal with a second threshold value to derive a second knocking signal when the derivative signal exceeds said second threshold value, a peak detecting circuit for detecting the peak of the derivative signal, a timing comparator for comparing a timings of said peak of the derivative signal with a reference timing related to an ignition timing and for producing a corresponding output, and a third comparator for comparing the output of the timing comparator with a third threshold value to derive a third knocking signal when the timing of the peak of the derivative signal is advanced with respect to a timing determined by the third threshold value.

2. An apparatus for detecting an operating condition of an internal-combustion engine, comprising:
a black body light radiating member for being arranged within a combustion chamber of an internal-combustion engine and radiating light energy;
a light propagating member having a first end to which the black body light radiating member is optically coupled and a second end;
a supporting member for supporting said light propagating member such that said black body light radiating member is situated at a position within the combustion chamber;
a light detecting member arranged to receive the light energy radiated by said black body light radiating member, propagated along said light propagating member and emanated from the second end of the light propagating member and for converting the received light energy into a temperature signal representing a temperature sensed by said black body light radiating member; and a signal processing circuit for processing the temperature signal supplied from said light detecting member to detect the operating condition of the internal-combustion engine, wherein said signal processing circuit comprises a first comparator for comparing the temperature signal with a first threshold value to derive a first knocking signal when the temperature signal exceeds the first threshold value, a differentiating circuit for differentiating said temperature signal in the time domain to produce a derivative signal, a second comparator for comparing said derivative signal with a second threshold value to derive a second knocking signal when the derivative signal exceeds said second threshold value, a peak detecting circuit for detecting the peak of the derivative signal, a timing comparator for comparing a timing of said peak of the derivative signal with a reference timing related to an ignition timing of the peak of the derivative signal and for producing a corresponding output, a third comparator for comparing the output of the timing comparator with a third threshold value to derive a third knocking signal when the timing of the peal of the derivative signal is advanced with respect to a timing determined by the third threshold value, and an OR gate for receiving said first, second and third knocking signals to derive a fourth knocking signal when at least one of said first, second and third knocking signals is generated.

3. An apparatus for detecting an operating condition of an internal-combustion engine, comprising:

a black body light radiating member for being arranged within a combustion chamber of an internal-combustion engine and radiation light energy whose intensity is in proportion to a heat flux flowing therethrough;

a light propagating member having a first end to which the black body light radiating member is optically coupled and a second end;

a supporting member for supporting said light propagating member such that said black body light radiating member is situated at a position within the combustion chamber;

a light detecting member arranged to receive the light energy radiated by said black body light radiating member, propagated along said light propagating member and emanated from the second end of the light propagating member and for converting the received light energy into a temperature signal representing a temperature sensed by said black body light radiating member; and a signal processing circuit for processing the temperature signal supplied from said light detecting member to detect the operating condition of the internal-combustion engine, wherein said signal processing circuit comprises a first comparator for comparing the temperature signal with a first threshold value to derive a first knocking signal when the temperature signal exceeds the first threshold value, a differentiating circuit for differentiating said temperature signal in the time domain to produce a derivative signal, a second comparator for comparing said derivative signal with a second threshold value to derive a second knocking signal when the derivative signal exceeds said second threshold value, a peak detecting circuit for detecting the peak of the derivative signal, a timing comparator for comparing a timing related to an ignition timing and for producing a corresponding output, a third comparator for comparing the output of the timing comparator with a third threshold value to derive a third knocking signal when the timing of the peak of the derivative signal is advanced with respect to a timing determined by the third threshold value, and an AND gate for receiving said first, second and third knocking signals to derive a fourth knocking signal when all the first, second and third knocking signals are generated at the same time.

4. An apparatus for detecting an operating condition of an internal-combustion engine, comprising:

a black body light radiating member for being arranged within a combustion chamber of the internal-combustion engine and for radiating light energy;

a light propagating having a first end to which the black body light radiating member is optically coupled and a second end;

a supporting member for supporting said light propagating member such that said black body light radiating member is situated at a position within the combustion chamber;

a light detecting member arranged to receive the light energy radiated by said black body light radiating member, propagated along said light propagating member and emanated from the second end of the light propagating member and for converting the received light energy into a temperature signal representing a temperature sensed by said black body light radiating member; and a signal processing circuit for processing the temperature signal supplied from said light detecting member to detect the operating condition of the internal-combustion engine, wherein said signal processing circuit comprises:

a differentiating circuit for differentiating said temperature signal in the time domain to produce a derivative signal;

a peak detecting circuit for detecting a peak of the derivative signal;

a timing comparator for comparing a timing of said peak of the derivative signal with a reference timing related to an ignition timing and for producing a corresponding output; and a second comparator for comparing the output of the timing comparator with a threshold value to derive a knocking signal when the timing of the peak of the derivative signal is advanced with respect to a timing determined by said threshold value.

* * * * *